United States Patent

Tanaglia

[11] Patent Number: 5,919,877
[45] Date of Patent: *Jul. 6, 1999

[54] PROCESS FOR THE PREPARATION OF ETHYLENE-PROPYLENE COPOLYMERS

[75] Inventor: Tiziano Tanaglia, Bologna, Italy

[73] Assignee: Enichem Elastomeri S.r l., Milan, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/940,989

[22] Filed: Sep. 30, 1997

Related U.S. Application Data

[63] Continuation of application No. 08/644,064, May 9, 1996, abandoned.

[30] Foreign Application Priority Data

Jun. 30, 1995 [IT] Italy ................................. MI95A1403

[51] Int. Cl.⁶ ....................................................... C08F 2/18
[52] U.S. Cl. .......................... 526/153; 526/172; 526/904; 526/905; 502/108; 502/110
[58] Field of Search ................... 526/153, 172, 526/904, 905

[56] References Cited

U.S. PATENT DOCUMENTS

| | | | |
|---|---|---|---|
| 3,370,052 | 2/1968 | Mostardini et al. | 260/88.2 |
| 4,579,836 | 4/1986 | Arzoumanidis et al. | 502/133 |
| 4,970,279 | 11/1990 | Bailly et al. | 526/63 |
| 4,981,928 | 1/1991 | Agapiou | 526/116 |
| 5,166,281 | 11/1992 | Chamla et al. | 526/125 |
| 5,480,850 | 1/1996 | Cann et al. | 502/127 |

FOREIGN PATENT DOCUMENTS

| | | |
|---|---|---|
| 0 133 783 | 3/1985 | European Pat. Off. . |
| 0 453 088 | 10/1991 | European Pat. Off. . |
| 0 630 915 | 12/1994 | European Pat. Off. . |
| 2 053 400 | 5/1971 | Germany . |
| 1 295 681 | 11/1972 | United Kingdom . |

OTHER PUBLICATIONS

Tony Whelan, "Polymer Technology Dictionary", p. 1, 1994.

*Primary Examiner*—David W. Wu
*Attorney, Agent, or Firm*—Oblon, Spivak, McClelland, Maier & Neustadt, P.C.

[57] ABSTRACT

Process for the in situ polymerization of ethylene with $C_3$–$C_{10}$ alpha-olefins in suspension of liquid monomer in the presence of a catalyst containing Vanadium obtained by the precipitation, in an atmosphere of ethylene or alpha-olefins, of:

a) a compound of Vanadium in the oxidation state of 3 to 5, with b) a basically hydrocarbon solution of a compound selected from those having general formula $R_nAlX_m$ wherein R is a $C_1$–$C_{20}$ alkyl radical, X is a halogen, m+n=3, n is an integer from 0 to 2.

15 Claims, No Drawings

PROCESS FOR THE PREPARATION OF ETHYLENE-PROPYLENE COPOLYMERS

This application is a Continuation of application Ser. No. 08/644,064 filed May 9, 1996, now abandoned.

The present invention relates to a process for the preparation of ethylene propylene (EP) elastomeric copolymers and ethylene propylene diene (EPDM) elastomers in processes of the heterogeneous type such as suspension or gas phase, preferably suspension.

At present, ethylene-propylene elastomeric copolymers are produced in solution and in slurry phase in the presence of Vanadium catalysts. This technique has the disadvantage of considerably fouling the polymerization reactor, due to the irregular growth of the polymer.

There are, on the other hand, patent documents claiming supported Vanadium catalysts, which try to overcome this problem. For example GB-A-1.309.303 describes a process in which the polymerization is carried out in a liquid medium consisting of one of the monomers and in the presence of a supported catalyst of the Ziegler-Natta type comprising a halide of a metal of group IVB, VB, VIB and an organometallic halide.

The process which uses supported catalysts however has the disadvantage that the polymer obtained contains the catalytic carrier.

A process has now been found which overcomes the above drawbacks as it enables the production of copolymers with a morphology which does not foul the reactor and does not pollute the polymer with the catalytic carrier.

The elastomers obtained with the process of the present invention are in fact characterized by an improved morphology, and the polymerization process is characterized by a substantial absence of or at least great reduction in the fouling of the reactor.

In accordance with this, the present invention relates to a process for the polymerization of ethylene with $C_3$–$C_{10}$ alpha-olefins, preferably propylene, and possibly with a non-conjugated diene, the above process being carried out in a suspension of liquid monomer in the presence of a catalyst containing Vanadium and a cocatalyst basically consisting of an organoaluminum compound of organoaluminum and optionally in the presence of a halogenated promoter, characterized in that the above catalyst containing Vanadium, insoluble in the reaction environment, is the precipitate obtained by mixing, in an atmosphere of ethylene or alpha-olefins:

a) a compound of Vanadium in the oxidation state of 3 to 5, preferably a solution or suspension of the above Vanadium compound, and;

b) a basically hydrocarbon solution of a compound selected from those having general formula (I) $R_nAlX_m$ wherein R is a $C_1$–$C_{20}$ alkyl radical, X is a halogen, m+n=3, n is an integer from 0 to 2.

When the Vanadium compound of step (a) is in the form of a suspension, the above Vanadium compound must have a particle size of less than 200 microns, preferably less than 30 microns. It is preferable however for the Vanadium compound used to be soluble in hydrocarbons and mixtures of Vanadium salts can also be used.

According to the process of the present invention, the interaction between the compound of Aluminium and that of Vanadium in an atmosphere of ethylene or alpha-olefins, produces a prepolymerized catalytic species insoluble in the environment of practically hydrocarbon solvent.

The reaction time between Vanadium and Al-alkyl, in an ethylene atmosphere, is between a few minutes and several hours, generally between 2 minutes and 2 hours, and is also selected in relation to the prepolymerization rate.

The prepolymerization is carried out so that the ratio between grams of prepolymer and grams of Vanadium is between 2 and 150, preferably between 6 and 35, more preferably between 8 and 15.

The above treatment can be carried out within a wide temperature range, which can vary from −30 to 80° C., preferably from 15 to 28° C.

The catalytic species thus formed can be stored and used directly in the form of a suspension, as obtained in the above process; alternatively, it is possible to filter and dry the catalytic precipitate thus obtained, and in this case the Vanadium catalytic compound will be redispersed in the desired solvent.

The mixing of the two components (a) and (b) can be carried out at more or less atmospheric pressure, or under pressure of ethylene or alpha-olefin, generally less than 10 atmospheres, preferably at atmospheric pressure.

In the preferred form of embodiment the molar ratio between the Aluminium compound of formula (I) and the Vanadium compound is between 1 and 20, preferably between 1.5 and 5.

Typical examples of these salts are Vanadyl trihalides, alkoxyhalides and alkoxides, such as $VOCl_3$, $VOCl_2(OBu)$ and $VO(OEt)_3$; Vanadium tetrahalides and alkoxyhalides such as $VCl_4$ and $VCl_3O$ (Bu); Vanadium and Vanadyl acetylacetonates, such as $V(acac)_3$, $VOCl_2(acac)$, $VOCl(acac)_2$, wherein acac is acetylacetonate; complexes between Vanadium halide and Lewis bases such as $VCl_3 \cdot 2THF$ wherein THF is tetrahydrofuran.

In the preferred form of embodiment the Vanadium compound is the V(III) acetylacetonate.

With respect to the organoaluminum compounds having general formula (I), alkyl Aluminium Chlorides such as $Al(C_2H_5)_2Cl$, $Al(C_2H_5)Cl_2$, are particularly useful.

To obtain the catalyst of the present invention, it is necessary for the contact between the Vanadium compound and the solution of organoaluminum compounds having general formula (I) to take place in an atmosphere of ethylene or ethylene-alpha olefin. In fact, the precipitate which is obtained without ethylene or alpha-olefin is not as efficient as that of the present invention.

At the end of the preparation, particles of catalyst are obtained coated with a layer of homo or copolymer, which is basically a prepolymerized catalyst.

The catalyst obtained with the above process is used in the preparation of EP copolymers together with a co-catalyst having general formula (I), well known to experts in the field. Alkyl Aluminium chlorides such as $Al(C_2H_5)_2Cl$, $Al(C_2H_5)Cl_2$, are particularly useful, the most preferred being diethylaluminium chloride.

The molar ratio between co-catalyst of Al and Vanadium compound can vary from 5 to 1000, preferably from 9 to 60. These ratios are more or less the same as those used in the presence of non-prepolymerized catalysts.

In the copolymerization process it is preferable, as known to experts in the field, to also use a catalysis activator. These activators usually belong to the group of chlorinated organic compounds, for example ethyl trichloroacetate, n-butyl perchlorocrotonate, diethyl dichloromalonate, carbon tetrachloride, chloroform. The molar ratio between activator and Vanadium can vary from 0/1 to 1000/1, preferably from 0.5/1 to 40/1, even more preferably from 1/1 to 10/1.

The polymerization process of the present invention is preferably carried out in suspension, in a reaction medium in which the polymer is basically insoluble. In the preferred form of embodiment the reaction medium prevalently consists of one of the comonomers, to which a saturated hydrocarbon, such as propane, butane, pentane, hexane or aromatics, preferably propane, is optionally added as diluent.

The polymerization temperature is maintained at between −5° C. and 65° C., preferably between 25° C. and 50° C. The contact times vary from 10 minutes to 6 hours, preferably from 15 minutes to 1 hour.

The polymerization is generally carried out with hydrogen as molecular weight moderator and regulator, operating at a total pressure of between 5 and 100 bars, preferably between 8 and 30 bars, with a ratio between partial ethylene pressure and partial hydrogen pressure higher than 4, preferably higher than 20. Other compounds however can be used as molecular weight regulators, for example diethylzinc.

The elastomeric copolymers which can be obtained with the process of the present invention contain from 35% to 85% by weight of ethylene, preferably between 45% and 75% by weight, and have an intrinsic viscosity measured at 135° C. in o-dichlorobenzene of between 0.5 and 6 dl/g, preferably between 1 and 3 dl/g. The above ethylene-propylene elastomeric copolymers can also contain other higher alpha-olefins, generally in a quantity of not more than 20% by weight, usually less than 10%. The term higher alpha-olefin refers to alpha-olefins having from 4 to 10 carbon atoms, for example butene-1, pentene-1, hexene-1.

As is known to experts in the field, ethylene and propylene can be copolymerized with non-conjugated dienes to give (EPDM) elastomeric terpolymers. These termonomers can be selected from:

dienes with a linear chain such as 1,4-hexadiene and 1,6-octadiene;

acyclic dienes with a branched chain such as 5-methyl-1,4-hexadiene; 3,7-dimethyl-1,6-octadiene; 3,7-dimethyl 1,7-octadiene;

alicyclic dienes with a single ring such as 1,4-cyclohexadiene, 1,5-cyclooctadiene; 1,5-cyclododecadiene;

dienes having condensed and bridged alicyclic rings such as methyltrahydroindene; dicyclopentadiene; bicyclo [2.2.1]hepta-2,5-2,5-diene; alkenyl, alkylidene, cycloalkenyl, and cycloalkylidene norbornenes such as 5-methylene-2-norbornene; 5-ethylidene-2-norbornene (ENB); 5-propenyl-2-norbornene.

Among the non-conjugated dienes typcially used for preparing these copolymers, dienes containing at least one double bond in a strained ring are preferred, even more preferred is 5-ethylidene-2-norbornene (ENB).

The above non-conjugated dienes can be present in a maximum quantity of 20% by weight, preferably 12% by weight.

Under the same conditions, the process of the present invention enables the production of copolymers and terpolymers in a subdivided form and with a controlled morphology, thus resulting in a lesser fouling of the polymerization reactor. In addition, the polymer obtained with the process of the present invention can be processed downstream to the reactor with a technology which, by fully exploiting the physical form and flow characteristic of the particles, is simpler than that of the prior art.

Compared to the supported catalysts described in IT-A Mi 94 A 02528 filed by the same Applicant, the process of the present invention has definite advantages. The first advantage consists in the fact that the polymer is without the approximately 2000–4000 ppm of silica or other inert carrier. The second advantage lies in the fact that the catalyst of the present invention is prepared with a very simple method, without the complexity required for the preparation of a supported catalyst. In fact, the impregnation phase of the carrier is extremely complex, mostly from an industrial point of view owing to the introduction of large quantities of dry powder into the reactor which must be subsequently subjected to stirring inside the reactor.

The following examples provide a better understanding of the present invention.

EXAMPLES

All the reagents are produced commercially; the solvents used in the polymerization and the activators were deaerated under nitrogen and anhydrified on alumina and molecular sieves. The organic compounds of Aluminium were used in a dilute solution in hexane.

The copolymers were characterized as follows:

A) Composition: this was determined by infra-red analysis of the polymer in the form of films having a thickness of 0.2 mm using a model 1760 Perkin Elmer FTIR spectrophotometer.

The propylene content was determined by measuring the ratio between the band absorbances at 4390 and 4255 cm$^{-1}$ and using a calibration curve obtained with standard polymers.

B) The intrinsic viscosity was determined at 135° C. in o-dichlorobenzene.

C) The Mooney viscosity ML(1+4) was determined at 125° C. according to ASTM-D1646-87.

D) The melting heat, correlating to the crystallinity of the copolymer, was determined by DSC with a Perkin-Elmer DSC37 instrument in an inert atmosphere and with a scanning rate of 20° C./min.

The crystallinity data indicated in the tables are obtained by relating the melting heat of the copolymer to the melting heat of the polyethylene established equal to 286 J7g.

E) The fouling degree of the polymerization reactor was determined by observing the morphology of the product at the end of the polymerization, after evaporation of the reaction medium.

When there is no presence of particles, the degree is "D".

When the polymer is present in the form of particles englobed (molten) in the polymeric mass, the degree is "C".

When the polymer is present in the form of well-subdivided and identifiable but attached particles, the degree is "B".

When the polymer is present in the form of completely isolated and free-flowing particles, the degree is "A".

The results C/D relate to polymers in which most of the polymer is type D; however there are some particles which are englobed in the polymeric mass.

The results B/C relate to polymers which are partly present as molten particles in the polymeric mass and partly separated but attached to each other.

The results A/B relate to polymers in which the particles, well-identifiable and separated, are only partially attached to each other, i.e. that they are easily moved.

Comparative Example 1

Copolymerization of Ethylene and Propylene 830 grams of liquid propylene were placed in a 2.8 dm$^3$ perfectly anhydrous pressure-resistant reactor equipped with a propeller stirrer. The pressure-resistant reactor is thermostat-regulated at 40° C., saturated with ethylene until an overpressure of 3.5 bars is reached and then with an additional pressure of 0.1 bars of hydrogen. The total pressure in the top of the pressure-resistant reactor was 19.1 bars.

A hexane solution containing 2.36 mmoles of DEAC (diethylaluminium chloride) and subsequently 0.043 mmoles of Vanadium (III) acetylacetonate and 0.03 mmoles of ethyl trichloroacetate dissolved in toluene, were then introduced into the pressure-resistant reactor.

The reaction is carried out at a constant temperature, feeding the ethylene in continuous to keep the total pressure constant.

After 60 minutes the monomers were evaporated and the pressure-resistant reactor was opened. Fouling degree "D".

38 grams of polymer were recovered. The characterizations are shown in table 1.

Comparative Example 2

740 grams of liquid propylene were placed in a 2.8 dm$^3$ perfectly anhydrous pressure-resistant reactor equipped with a propeller stirrer. The pressure-resistant reactor is thermostat-regulated at 40° C., saturated with ethylene until an overpressure of 8.2 bars is reached and then with an additional pressure of 0.5 bars of hydrogen. The total pressure in the top of the pressure-resistant reactor was 24.2 bars.

A hexane solution containing 4.6 mmoles of DEAC and subsequently 0.114 mmoles of Vanadium (III) acetylacetonate and 0.459 mmoles of ethyl trichloroacetate dissolved in toluene, were then introduced into the pressure-resistant reactor, in small portions.

The reaction is carried out at a constant temperature, feeding the ethylene in continuous to keep the total pressure constant.

After 60 minutes the monomers were evaporated and the pressure-resistant reactor was opened. Fouling degree "C/D".

157 grams of polymer were recovered.

The relative characterizations are shown in table 1.

Example 3
A) Preparation of the Catalyst 10 ml of a solution of vanadium (III) acetylacetonate containing 16.8 g/l of metallic Vanadium in toluene are introduced into a test-tube under nitrogen and magnetic stirring.

5 ml of a solution of DEAC at 140 g/l in hexane are then added, in an atmosphere of ethylene (Molar ratio Aluminium/Vanadium=1.76).

The mixture is stirred for 10 minutes, still in an ethylene atmosphere, during which the consumption of ethylene is observed. At the end of the 10 minutes the ethylene is removed with nitrogen. An extremely fine suspension is obtained which is difficult to decant and has a vanadium content of 11.2 g/l.
B) Copolymerization of Ethylene and Propylene 790 grams of liquid propylene were charged into a 2.8 dm$^3$ perfectly anhydrous pressure-resistant reactor equipped with a propeller stirrer. The pressure-resistant reactor is thermostat-regulated at 40° C., saturated with ethylene until an overpressure of 5 bars is reached and then with an additional pressure of 0.1 bars of hydrogen. The total pressure in the top of the pressure-resistant reactor was 20.6 bars.

A hexane solution containing 5.74 mmoles of DEAC and subsequently an aliquot of the catalyst previously prepared equal to 0.108 mmoles of Vanadium suspended in hexane and 0.9 mmoles of ethyl trichloroacetate, were then introduced into the pressure-resistant reactor. The total molar ratio between Aluminium and Vanadium, considering both the preparation step of the catalyst and the actual polymerization, is equal to 54.9.

The reaction is carried out at a constant temperature, feeding the ethylene in continuous to keep the total pressure constant.

After 60 minutes the monomers are evaporated and the pressure-resistant reactor is opened. Fouling degree "B".

140 grams of polymer were recovered. The characterizations are shown in table 1.

Example 4

Copolymerization of Ethylene and Propylene 770 grams of liquid propylene are charged into the pressure-resistant reactor described above, the pressure-resistant reactor is thermostat-regulated at 40° C., saturated with ethylene until an overpressure of 6.58 bars is reached and then with an additional pressure of 0.5 bars of hydrogen. The total pressure in the top of the pressure-resistant reactor is 22.6 bars.

A hexane solution containing 4.9 mmoles of DEAC and subsequently an aliquot of the catalyst suspended in hexane of example 3 equal to 0.098 mmoles of Vanadium and 0.78 mmoles of ethyl trichloroacetate, were then introduced into the pressure-resistant reactor. The reaction is carried out at a constant temperature, feeding the ethylene in continuous to keep the total pressure constant.

After 60 minutes the monomers are evaporated and the pressure-resistant reactor is opened. Fouling degree "B".

130 grams of polymer are recovered and the characterizations are shown in table 1.

Example 5
A) Preparation of the Catalyst 9.8 ml of a solution of Vanadium (III) acetylacetonate containing 16.8 g/l of metallic Vanadium in toluene are introduced into a test-tube under nitrogen and magnetic stirring.

19.9 ml of a solution containing 14.3 ml of Isopar G (mixture of $C_9$–$C_{12}$ isoparaffins) and 5.6 ml of DEAC at 140 g/l in hexane are then added, in an atmosphere of ethylene, (molar ratio Aluminium/Vanadium=2.04).

The mixture is left in an atmosphere of ethylene for 10 minutes during which the consumption of ethylene is observed. At the end of the 10 minutes the ethylene is removed with nitrogen; an extremely fine suspension is obtained which is difficult to decant and has a vanadium content equal to 5.5 g/l.
B) Copolymerization of Ethylene and Propylene 790 grams of liquid propylene were charged into the pressure-resistant reactor. The pressure-resistant reactor is thermostat-regulated at 40° C., saturated with ethylene until an overpressure of 5 bars is reached and then with an additional pressure of 0.1 bars of hydrogen. The total pressure in the top of the pressure-resistant reactor was 20.6 bars.

A hexane solution containing 5.74 mmoles of DEAC and subsequently an aliquot of the catalyst previously prepared equal to 0.108 mmoles of Vanadium suspended in hexane and 0.9 mmoles of ethyl trichloroacetate, were then introduced into the pressure-resistant reactor.

The reaction is carried out at a constant temperature, feeding the ethylene in continuous to keep the total pressure constant.

After 60 minutes the monomers are evaporated and the pressure-resistant reactor is opened. Fouling degree "B".

120 grams of polymer are recovered and the characterizations are shown in table 1.

Example 6

Copolymerization of Ethylene-Propylene 790 grams of liquid propylene are charged into the pressure-resistant reactor described above. The pressure-resistant reactor is thermostat-regulated at 40° C., saturated with ethylene until an overpressure of 5 bars is reached and then with an additional pressure of 0.1 bars of hydrogen. The total pressure in the top of the pressure-resistant reactor is 20.6 bars.

A hexane solution containing 5.76 mmoles of DEAC and subsequently an aliquot of the catalyst of example 5, equal to 0.108 mmoles of Vanadium suspended in hexane and 0.9 mmoles of ethyl trichloroacetate, are then introduced into the pressure-resistant reactor. The total molar ratio between Aluminium and Vanadium, is equal to 55.2.

The reaction is carried out at a constant temperature, feeding the ethylene in continuous to keep the total pressure constant.

After 60 minutes the monomers are evaporated and the pressure-resistant reactor is opened. Fouling degree "B".

110 grams of polymer are recovered and the characterizations are shown in table 1.

Example 7

Copolymerization of Ethylene and Propylene 740 grams of liquid propylene are charged into the pressure-resistant reactor described above. The pressure-resistant reactor is thermostat-regulated at 40° C., saturated with ethylene until an overpressure of 8.2 bars is reached and then with an additional pressure of 0.2 bars of hydrogen.

A hexane solution containing 2.88 mmoles of DEAC and subsequently an aliquot of the catalyst of example 5, equal to 0.059 mmoles of Vanadium suspended in hexane and 0.468 mmoles of ethyl trichloroacetate, are then introduced into the pressure-resistant reactor. (Total ratio Aluminium/Vanadium=50.9).

The reaction is carried out at a constant temperature, feeding the ethylene in continuous to keep the total pressure constant.

After 60 minutes the monomers are evaporated and the pressure-resistant reactor is opened. Fouling degree "A/B".

142 grams of polymer are recovered and the characterizations are shown in table 1.

TABLE 1

| EX-AMPLES | %w.Propylene | ML (1 + 4) at 125° C. | [η] at 135° C. dl/g | Yield Kg/gV | Crystallinity % |
|---|---|---|---|---|---|
| Comp. 1 | 43.4 | 47 | 1.7 | 17.3 | 0.87 |
| Comp. 2 | 35.4 | 30 | 1.4 | 27 | 3.81 |
| 3 | 43.8 | 35 | 1.7 | 25.4 | 0.37 |
| 4 | 40.5 | 18 | 1.3 | 26 | 1.71 |
| 5 | 42.7 | 33 | 1.55 | 21 | 0.33 |
| 6 | 41.3 | 41 | 1.30 | 20 | 0.35 |
| 7 | 35.7 | 48 | 1.80 | 47.2 | — |

We would like to point out that in examples 6 and 7 of patent application IT-A-Mi 94a 02528 filed by the same Applicant in which supported catalysts are claimed, the catalytic yields are 20 and 21.1 kg/gV respectively. On the basis of the composition of the catalyst described in the above patent application, this corresponds to 2700 and 3500 ppm respectively of silica on the polymer, which is obviously absent in the polymer of the present invention.

Comparative Example 8

740 grams of liquid propylene are placed in a 2.8 dm$^3$ perfectly anhydrous pressure-resistant reactor equipped with a propeller stirrer. The pressure-resistant reactor is thermostat-regulated at 40° C., saturated with ethylene until an overpressure of 8.2 bars is reached and then with an additional pressure of 0.2 bars of hydrogen. The total pressure in the top of the pressure-resistant reactor was 24 bars.

A hexane solution containing 3.9 mmoles of DEAC (diethylaluminium chloride) and subsequently 0.078 mmoles of Vanadium (III) acetylacetonate suspended in hexane and vaseline oil, containing 0.63 mmoles of ethyl trichloroacetate, were then introduced into the pressure-resistant reactor.

The reaction is carried out at a constant temperature, feeding the ethylene in continuous to keep the total pressure constant.

After 60 minutes the monomers were evaporated and the pressure-resistant reactor was opened. Fouling degree "C/D".

122 grams of polymer were recovered and the relative characterizations are shown in table 2.

Comparative Example 9

740 grams of liquid propylene are placed in a 2.8 dm$^3$ perfectly anhydrous pressure-resistant reactor equipped with a propeller stirrer. The pressure-resistant reactor is thermostat-regulated at 40° C., saturated with ethylene until an overpressure of 8.2 bars is reached and then with an additional pressure of 0.2 bars of hydrogen. The total pressure in the top of the pressure-resistant reactor was 24 bars.

A hexane solution containing 3.9 mmoles of DEAC (diethylaluminium chloride) was then introduced into the pressure-resistant reactor and subsequently a suspension in hexane and vaseline oil of a precipitate obtained by adding, in a nitrogen atmosphere, 0.078 mmoles of Vanadium (III) acetylacetonate to 0.117 mmoles of DEAC (Total ratio Al/V=1.5). 0.63 mmoles of ethyl trichloroacetate, are then introduced into the pressure-resistant reactor.

The reaction is carried out at a constant temperature, feeding the ethylene in continuous to keep the total pressure constant.

After 60 minutes the monomers were evaporated and the pressure-resistant reactor was opened. Fouling degree "B/C".

140 grams of polymer were recovered and the relative characterizations are shown in table 2.

Example 10

A) Preparation of the Catalyst 19.7 grams of a suspension of Vanadium (III) acetylacetonate at a concentration of 1.18% of Vanadium in paraffin oil are charged into a glass flask, under nitrogen and mechanical stirring, followed by 40 ml of isopar-G (mixture of $C_9$–$C_{12}$ isoparaffins).

The flask is saturated with ethylene, and then 16 ml of a solution of DEAC equal to 0.85 grams in 10 ml of isopar-G and 6 ml of hexane (Al/V=1.5) are added.

The mixture is left in an atmosphere of ethylene for 20 minutes during which the consumption of ethylene is observed. At the end of the 20 minutes the ethylene is removed with nitrogen.

The catalytic suspension is poured into a test-tube, then diluted in isopar-G obtaining 126 ml of suspension at 0.18% weight/volume of Vanadium.

B) Copolymerization of Ethylene and Propylene 740 grams of liquid propylene are placed in a 2.8 dm$^3$ perfectly anhydrous pressure-resistant reactor equipped with a propeller stirrer. The pressure-resistant reactor is thermostat-regulated at 40° C., saturated with ethylene until an overpressure of 8.2 bars is reached and then with an additional pressure of 0.2 bars of hydrogen. The total pressure in the top of the pressure-resistant reactor was 24 bars.

A hexane solution containing 3.9 mmoles of DEAC and subsequently an aliquot of the catalyst previously prepared in an atmosphere of ethylene equal to 0.078 mmoles of Vanadium suspended in hexane and 0.63 mmoles of ethyl trichloroacetate are then introduced into the pressure-resistant reactor.

The reaction is carried out at a constant temperature, feeding the ethylene in continuous to keep the total pressure constant.

After 60 minutes the monomers were evaporated and the pressure-resistant reactor was opened. Fouling degree "A/B".

186 grams of polymer were recovered and the relative characterizations are shown in table 2.

TABLE 2

| EXAMPLE | weight % propylene | ML (1 + 4) at 125° C. | Yield kg/gV | Cryst. % |
|---------|--------------------|-----------------------|-------------|----------|
| 8C      | 40.1               | 48                    | 30.0        | 3.8      |
| 9C      | 41.8               | 31                    | 35.0        | 2.4      |
| 10      | 40.5               | 33                    | 46.5        | 2.5      |

Example 8C refers to a polymerization process in the presence of a suspension of Vanadium acetylacetonate, as well as DEAC and the activator.

Example 9C refers to a process in the presence of a catalytic system which comprises the catalyst precipitated by treatment of Vanadium acetylacetonate with DEAC in the presence of nitrogen, and therefore without prepolymerization.

Example 10 is part of the present invention and differs from example 9C in that the treatment of Vanadium with Aluminium is carried out in an ethylene environment.

In all these examples (from 8 to 10), the total ratio (Aluminium+Vanadium) with respect to the olefinic monomers is almost constant.

From the data of Table 2, it can be clearly seen that the catalyst prepared according to the process of the present invention gives better results.

I claim:

1. A process for the in situ polymerization of ethylene consisting essentially of polymerizing ethylene with one or more $C_3$–$C_{10}$ α-olefins in the presence of a catalyst consisting essentially of vanadium (III) acetylacetonate, a co-catalyst consisting essentially of an alkylaluminum halide compound and optionally a halogenated promoter, wherein said catalyst is insoluble in the reaction environment, and wherein said catalyst is a suspension obtained by mixing, in an atmosphere of ethylene or said one or more α-olefins:

a) vanadium (III) acetylacetonate; and
   b) a hydrocarbon solution of an alkylaluminum halide compound.

2. The process of claim 1, wherein mixing of said vanadium (III) acetylacetonate and said hydrocarbon solution of an alkylaluminum halide compound is effected in an atmosphere of ethylene.

3. The process of claim 1, wherein said vanadium (III) acetylacetonate is in a hydrocarbon solution or suspension.

4. The process of claim 1, wherein said alkylaluminum halide compound has the formula $R_n AlX_m$, wherein R is $C_1$–$C_{20}$ alkyl, X is halogen, (m+n)=3, and n is an integer from 0 to 2.

5. The process of claim 4, wherein said halogen is chlorine.

6. The process of claim 5, wherein said alkylaluminum chloride compound is selected from the group consisting of $Al(C_2H_5)_2Cl$ and $Al(C_2H_5)Cl_2$.

7. The process of claim 6, wherein said alkylaluminum chloride compound is $Al(C_2H_5)_2Cl$.

8. The process of claim 1, wherein said vanadium (III) acetylacetonate and said alkylaluminum halide compound are used in a molar ratio of between 1 and 20.

9. The process of claim 8, wherein said molar ratio is between about 3 to 5.

10. The process of claim 1, wherein a precipitate which is formed by mixing (a) and (b) contains a weight ratio of prepolymer and vanadium (III) acetylacetonate of between 2 and 150.

11. The process of claim 10, wherein the precipitate has a weight ratio of prepolymer and vanadium (III) acetylacetonate of between 6 and 35.

12. The process of claim 1, wherein polymerization is effected in a reaction medium in which the polymer is insoluble, at a temperature of between −5° C. and 65° C., with a contact time of between 10 minutes and 6 hours, in the presence of hydrogen, at a total pressure of between 5 and 100 bar, with a ratio between partial ethylene pressure and partial hydrogen pressure of more than 4.

13. The process of claim 12, wherein a suspension is used, and the reaction medium consists of one of the monomers optionally diluted with saturated hydrocarbon, at a temperature of between 25° C. and 50° C., with a contact time of between 15 minutes and 1 hour, in the presence of hydrogen, at a total pressure of between 8 and 30 bar, with a ratio of between partial ethylene pressure and partial hydrogen pressure of more than 20.

14. The process of claim 1, wherein said α-olefin is propylene.

15. The process of claim 1, wherein a halogenated promoter is employed and is selected from the group consisting of ethyl trichloroacetate, n-butyl perchlorocrotonate, diethyl dichloromalonate, carbon tetrachloride and chloroform.

* * * * *